United States Patent
Ohta

(10) Patent No.: US 9,755,675 B2
(45) Date of Patent: Sep. 5, 2017

(54) DISTORTION COMPENSATION DEVICE AND DISTORTION COMPENSATION METHOD

(71) Applicant: FUJITSU LIMITED, Kawasaki-shi, Kanagawa (JP)

(72) Inventor: Kohei Ohta, Sendai (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/355,208

(22) Filed: Nov. 18, 2016

(65) Prior Publication Data

US 2017/0149459 A1    May 25, 2017

(30) Foreign Application Priority Data

Nov. 20, 2015 (JP) ................................. 2015-227246

(51) Int. Cl.
    *H04B 1/04* (2006.01)

(52) U.S. Cl.
    CPC ... *H04B 1/0475* (2013.01); *H04B 2001/0425* (2013.01)

(58) Field of Classification Search
    CPC ............ H03F 2200/375; H03F 1/3241; H04L 27/368; H04B 1/0475; H04B 2001/0425
    See application file for complete search history.

(56) References Cited

U.S. PATENT DOCUMENTS

| 5,267,095 A | 11/1993 | Hasegawa et al. |
| 8,912,848 B2 * | 12/2014 | Lee ....................... H03F 1/3247 330/149 |
| 2003/0214359 A1 * | 11/2003 | Sasho ................... H03F 1/0266 330/310 |
| 2004/0189378 A1 | 9/2004 | Suzuki et al. |
| 2004/0212428 A1 | 10/2004 | Ode et al. |
| 2011/0298536 A1 | 12/2011 | Okazaki et al. |
| 2015/0028945 A1 * | 1/2015 | Gaynor ................... H03F 3/189 330/107 |

FOREIGN PATENT DOCUMENTS

| JP | 04-245062 | 9/1992 |
| JP | 2004-289504 | 10/2004 |
| WO | 02/087097 | 10/2002 |
| WO | 2010/073483 | 7/2010 |

* cited by examiner

*Primary Examiner* — Vineeta Panwalkar
(74) *Attorney, Agent, or Firm* — Fujitsu Patent Center

(57) ABSTRACT

A distortion compensation device coupled to an amplifier configured to amplify power of a transmission signal, the distortion compensation device including a memory, and a processor coupled to the memory and the processor configured to obtain the transmission signal sampled with a first sampling rate, obtain the transmission signal sampled with a second sampling rate, the second sampling rate being higher than the first sampling rate, extract an odd-order harmonic from the transmission signal sampled with the second sampling rate, correct a phase and an amplitude of the odd-order harmonic, add the corrected odd-order harmonic to the transmission signal with a first sampling rate, and output, toward the amplifier, the transmission signal to which the corrected odd-order harmonic is added.

6 Claims, 8 Drawing Sheets

DISTORTION COMPENSATION DEVICE AND DISTORTION COMPENSATION METHOD

CROSS-REFERENCE TO RELATED APPLICATION

This application is based upon and claims the benefit of priority of the prior Japanese Patent Application No. 2015-227246, filed on Nov. 20, 2015, the entire contents of which are incorporated herein by reference.

FIELD

The embodiments discussed herein are related to a distortion compensation device and a distortion compensation method.

BACKGROUND

A wireless communication device in a wireless communication system is provided with a power amplifier (hereinafter sometimes referred to as a "PA") that amplifies power of a transmission signal. In a wireless communication device, in order to increase the power efficiency of a PA, the PA is generally operated near the saturation region of the PA. However, if a PA is operated near the saturation region, nonlinear distortion increases. Thus, in order to suppress the nonlinear distortion and reduce an adjacent channel leakage power (ACP), a wireless device is provided with a distortion compensation device that compensates the nonlinear distortion.

As a distortion compensation method that is used for a distortion compensation device, there is a "predistortion method". Hereinafter "predistortion" is sometimes referred to as "PD". In a distortion compensation device of the PD method, a signal having the inverse characteristic to the nonlinear distortion of a PA is added to a transmission signal before the transmission signal is input to the PA so that the linearity of the output of the PA is increased in order to suppress the distortion of the output of the PA. The signal having the inverse characteristic to the nonlinear distortion of a PA is sometimes referred to as a "predistortion signal (PD signal)". Accordingly, the PD signal becomes a signal distorted in accordance with the inverse characteristic of the nonlinear distortion of the PA in advance.

For example, as a distortion compensation device of the PD method, there is a distortion compensation device that approximates the inverse characteristic of the nonlinear distortion of the PA by a power series and performs distortion compensation using the power series. Hereinafter distortion compensation using a power series is sometimes referred to as "series type distortion compensation". In a distortion compensation device using the series type distortion compensation, an odd-order harmonic signal is generated from a pilot signal having a narrower band than that of a transmission signal as a PD signal, the phase and the amplitude of the PD signal is corrected, and the corrected PD signal is added to the transmission baseband signal before the transmission baseband signal is input into the PA.

A related-art technique is disclosed in Japanese Laid-open Patent Publication No. 2004-289504.

SUMMARY

According to an aspect of the invention, a distortion compensation device coupled to an amplifier configured to amplify power of a transmission signal, the distortion compensation device including a memory, and a processor coupled to the memory and the processor configured to obtain the transmission signal sampled with a first sampling rate, obtain the transmission signal sampled with a second sampling rate, the second sampling rate being higher than the first sampling rate, extract an odd-order harmonic from the transmission signal sampled with the second sampling rate, correct a phase and an amplitude of the odd-order harmonic, add the corrected odd-order harmonic to the transmission signal with a first sampling rate, and output, toward the amplifier, the transmission signal to which the corrected odd-order harmonic is added.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In a distortion compensation device using the related-art series type distortion compensation, a PD signal is generated from a pilot signal having a narrower band than that of a transmission signal. The PD signal generated from the pilot signal only approximates the inverse characteristic of the nonlinear distortion of the PA when the transmission signal having a relatively narrow band is amplified in the PA. Accordingly, if the bandwidth of the transmission signal is sufficiently wide compared with the bandwidth of the pilot signal, it might become difficult for the PD signal to suitably approximate the inverse characteristic of the nonlinear distortion of the PA. As a result, there is a problem in that the distortion compensation precision deteriorates.

The disclosed technique has been made in view of the above, and it is desirable to provide a distortion compensation device and a distortion compensation method that are capable of improving the distortion compensation precision regardless of the size of the bandwidth of the transmission signal.

Following, a detailed description will be given of a distortion compensation device and a distortion compensation method according to embodiments of the present disclosure with reference to the drawings. In this regard, the disclosed technique is not limited to the embodiments. Also, in the embodiments, the same symbol is given to a configuration having the same function, and a duplicated explanation will be omitted.

Embodiment

Figure 1:
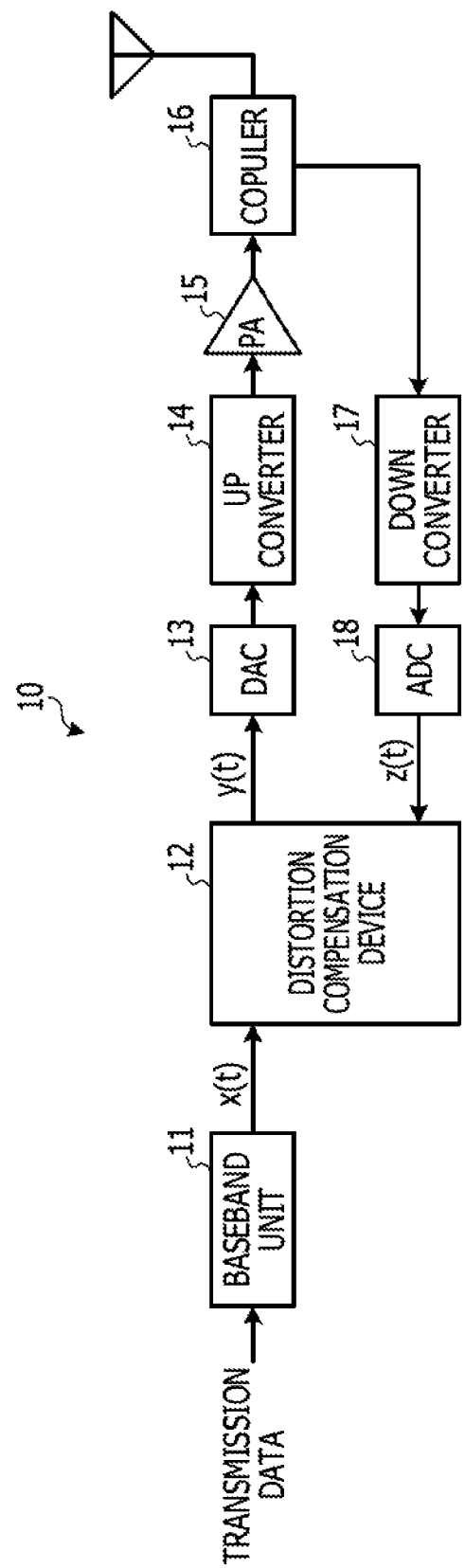
FIG. 1 is a block diagram illustrating an example of a wireless communication device including a distortion compensation device according to an embodiment.

FIG. 1 is a block diagram illustrating an example of a wireless communication device including a distortion compensation device according to this embodiment. In FIG. 1, a wireless communication device 10 includes a baseband unit 11, a distortion compensation device 12, a digital to analog converter (DAC) 13, an up converter 14, a power amplifier (PA) 15, and a coupler 16. Also, the wireless communication device 10 includes a down converter 17 and an analog to digital converter (ADC) 18. The wireless communication device 10 is mounted on, for example a wireless communication terminal device, a wireless communication base station device, or the like that is used in a wireless communication system.

The baseband unit 11 performs baseband processing, such as coding processing and modulation processing, or the like on the input transmission data so as to generate a transmission baseband signal (hereinafter abbreviated as a "transmission BB signal"). The baseband unit 11 then outputs the generated transmission baseband signal (that is to say, a transmission signal) x(t) to the distortion compensation device 12.

The distortion compensation device 12 is a distortion compensation device of the PD method. The distortion compensation device 12 generates a PD signal to be used for compensation for nonlinear distortion of the PA 15 from the transmission BB signal x(t), corrects the phase and the amplitude of the PD signal using a variable phase shifter and a variable gain amplifier, and adds the corrected PD signal to the transmission BB signal x(t). That is to say, using the PD signal, the distortion compensation device 12 compensates for the nonlinear distortion that occurs on the signal after the amplification by the PA 15. For example, the distortion compensation device 12 adds the PD signal to the transmission BB signal x(t) in order to generate a PD transmission signal y(t) and outputs the generated PD transmission signal y(t) to the DAC 13. Here, the transmission BB signal is an example of a signal before amplification by the PA 15. Also, the distortion compensation device 12 calculates an adjacent channel leakage power (ACP) of a feedback signal z(t) and controls the amount of phase shift of the variable phase shifter and the gain of the variable gain amplifier, which are used for correction of the phase and the amplitude of the PD signal based on the ACP. Here, the feedback signal is an example of a signal after amplification by the PA 15. In this regard, a detailed description will be given later of the distortion compensation device 12.

The DAC 13 converts the PD transmission signal y(t) from the digital signal to an analog signal and outputs the signal to the up converter 14.

The up converter 14 up converts the analog PD transmission signal and outputs the up-converted PD transmission signal to the PA 15.

The PA 15 amplifies power of the up-converted PD transmission signal and outputs the amplified signal to the coupler 16.

The coupler 16 distributes the amplified signal to the antenna and the feedback path (that is to say, the down converter 17). Thereby, the signal output from the PA 15 is fed back to the distortion compensation device 12 via the down converter 17 and the ADC 18.

The down converter 17 down converts the signal input from the coupler 16 and outputs the down-converted signal to the ADC 18.

The ADC 18 converts the down-converted signal from the analog signal to a digital signal and outputs the converted digital signal to the distortion compensation device 12 as the feedback signal z(t).

Figure 2:
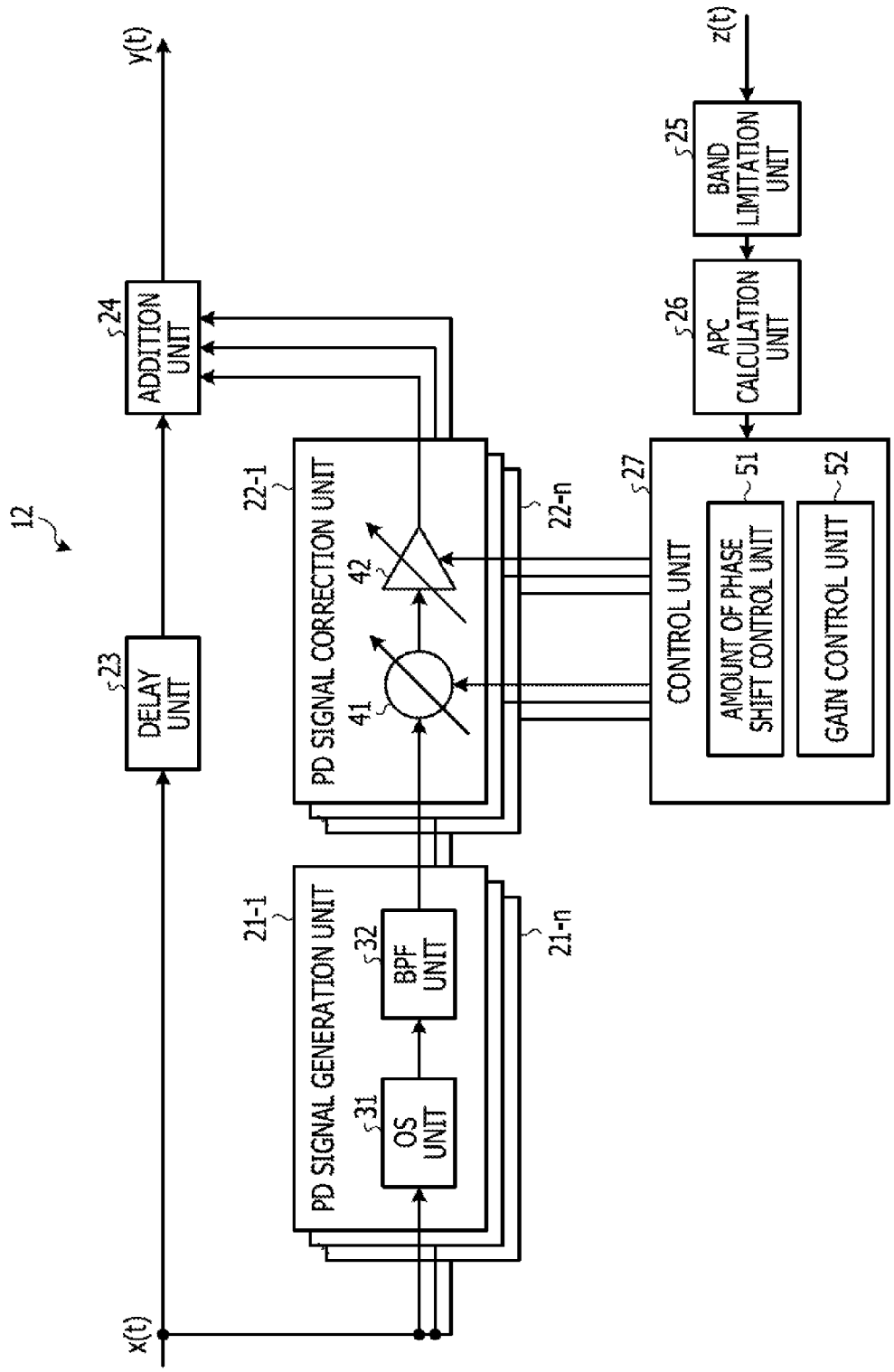
FIG. 2 is a block diagram illustrating an example of the distortion compensation device according to the embodiment.

FIG. 2 is a block diagram illustrating an example of the distortion compensation device according to the embodiment. In FIG. 2, the distortion compensation device 12 includes PD signal generation units 21-1 to 21-n, PD signal correction units 22-1 to 22-n, a delay unit 23, an addition unit 24, a band limitation unit 25, an ACP calculation unit 26, and a control unit 27.

In this regard, the PD signal generation units 21-1 to 21-n have the same configuration and functions, and thus are hereinafter expressed as a "PD signal generation unit 21" when they are not distinguished in particular. Also, the PD signal correction units 22-1 to 22-n have the same configuration and functions, and thus are hereinafter expressed as a "PD signal correction unit 22" when they are not distinguished in particular. Also, the PD signal correction units 22-1 to 22-n correspond to the PD signal generation units 21-1 to 21-n, respectively.

The PD signal generation unit 21 generates a PD signal from the transmission BB signal x(t) input into the distortion compensation device 12. As illustrated in FIG. 2, the PD signal generation unit 21 includes an over sampling (OS) unit 31 and a band pass filter (BPF) unit 32.

The OS unit 31 performs oversampling on the transmission BB signal x(t). That is to say, the OS unit 31 increases the sampling rate (that is to say, the sampling frequency) Fs of the transmission BB signal x(t) so as to generate odd-order harmonic signals of the transmission BB signal in the digital signal band defined by the sampling rate Fs. For example, the OS unit 31 of the PD signal generation unit 21-1 generates the third harmonic signal of the transmission BB signal, and the OS unit 31 of the PD signal generation unit 21-n generates the (2n+1) order harmonic signal (note that n is a natural number of 2 or more) of the transmission BB signal. The bandwidth of the odd-order harmonic signal generated by the OS unit 31 is the same as the bandwidth of the transmission BB signal x(t).

Figure 3:
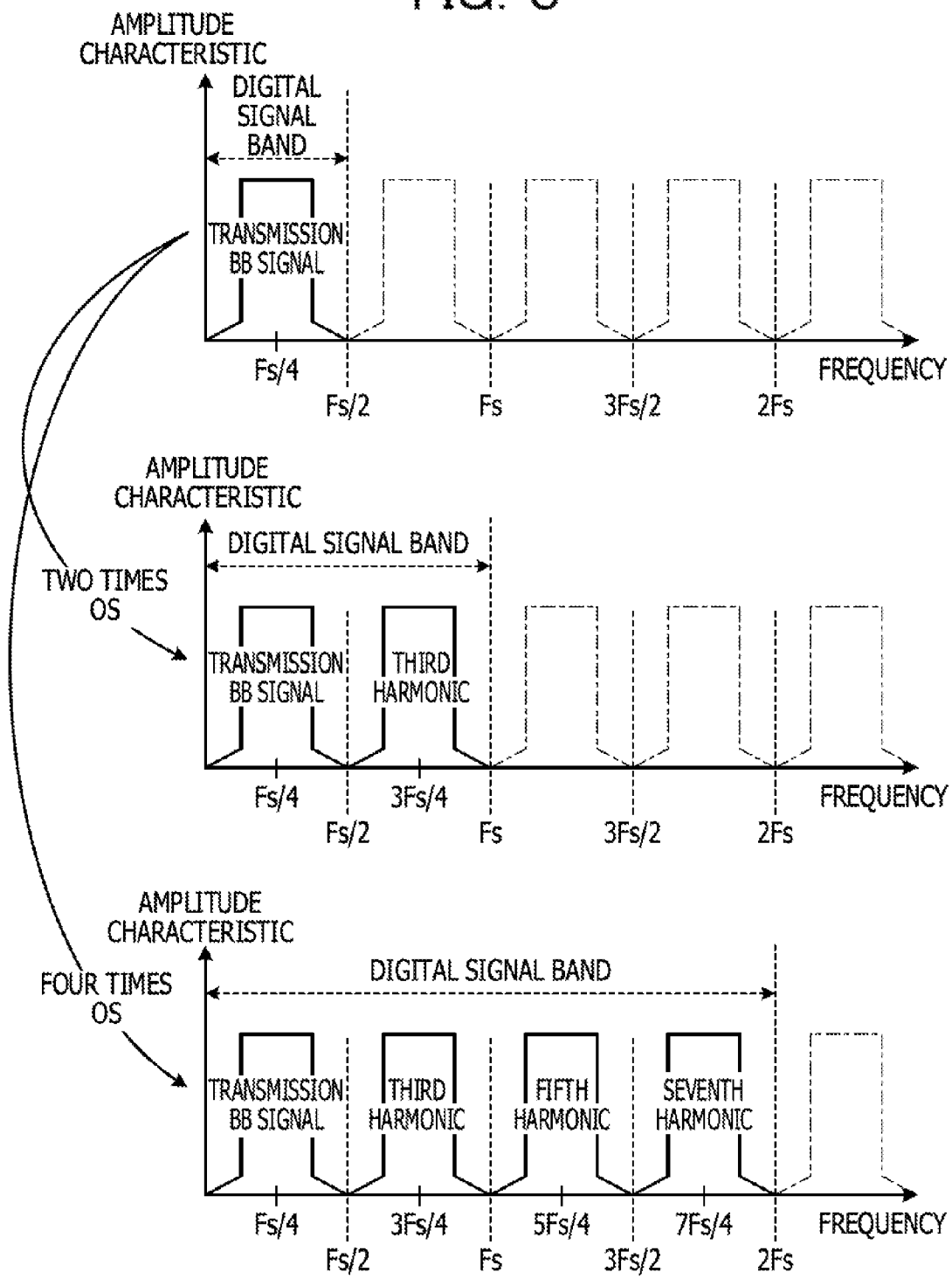
FIG. 3 is a diagram for explaining the occurrence of harmonics by oversampling.

FIG. 3 is a diagram for explaining the occurrence of harmonics by oversampling. As illustrated by the upper part of FIG. 3, the transmission BB signal before being subjected to oversampling exists in a frequency band of 0 to Fs/2, which is a digital signal band defined by the sampling rate Fs. For example, as illustrated by the middle part of FIG. 3, if the OS unit 31 increases the sampling rate Fs of the transmission BB signal to two times, the digital signal band is also increased to two times, and the third harmonic signal of the transmission BB signal occurs in the digital signal band. The bandwidth of the third harmonic signal that occurred in the digital signal is the same as the bandwidth of the transmission BB signal. Also, for example, as illustrated by the lower part of FIG. 3, if the OS unit 31 increases the sampling rate Fs of the transmission BB signal to four times, the digital signal band is also increased to four times, and the third, the fifth, and the seventh harmonic signals of the transmission signal occur in the digital signal band. The bandwidth of the third, the fifth, and the seventh harmonics that occur in the digital signal band are the same as the bandwidth of the transmission BB signal.

Figure 4:
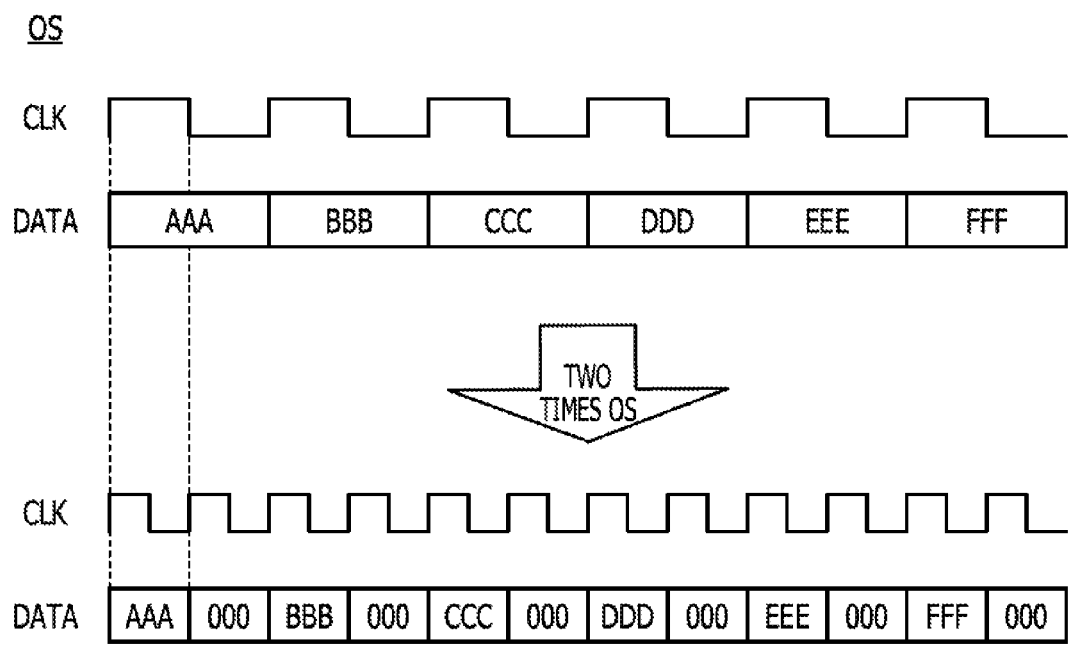
FIG. 4 is a diagram for explaining a transmission BB signal having an increased sampling rate.

FIG. 4 is a diagram for explaining a transmission BB signal having an increased sampling rate Fs. As illustrated in FIG. 4, if the OS unit 31 increases the sampling rate Fs of the transmission BB signal to two times, for example, the clock frequency of the transmission BB signal becomes two times, and "000" are interpolated at the end of the each sample ("AAA", or the like) of the transmission BB signal.

Referring back to FIG. 2, the BPF unit 32 extracts a harmonic signal from the transmission BB signal x(t), which has been subjected to the oversampling by the OS unit 31, and outputs the extracted harmonic signal to the PD signal correction unit 22 as a PD signal. For example, the BPF unit 32 of the PD signal generation unit 21-1 extracts the third harmonic signal and output the signal to the PD signal correction unit 22, and the BPF unit 32 of the PD signal generation unit 21-n extracts the (2n+1)-order harmonic signal and outputs the signal to the PD signal correction unit 22.

The PD signal correction unit 22 corrects the phase and the amplitude of the PD signal generated by the corresponding PD signal generation unit 21. Specifically, the PD signal correction unit 22 includes a variable phase shifter 41 and a variable gain amplifier 42, and corrects the phase and the amplitude of the PD signal using the amount of phase shift set in the variable phase shifter 41 and the gain set in the variable gain amplifier 42. The amount of phase shift set in the variable phase shifter 41 and the gain set in the variable gain amplifier 42 are controlled by the control unit 27 described later. For example, the amount of phase shift set in the variable phase shifter 41 and the gain set in the variable gain amplifier 42 are controlled such that the PD signal whose phase and amplitude have been corrected by the variable phase shifter 41 and the variable gain amplifier 42 respectively have the reversed phase and the same amplitude as those of the nonlinear distortion that occurs in the PA 15. The PD signal correction unit 22 outputs the PD signal whose phase and amplitude have been corrected to the addition unit 24.

The delay unit 23 delays the transmission BB signal x(t) that has been input into the distortion compensation device 12. That is to say, the delay unit 23 delays the transmission BB signal x(t) by a time period corresponding to the processing time in the PD signal generation unit 21 and the PD signal correction unit 22.

The addition unit 24 adds the PD signal having the phase and the amplitude corrected by the PD signal correction unit 22 to the transmission BB signal x(t) input from the delay unit 23. For example, the addition unit 24 adds the PD signal to the transmission BB signal x(t) and outputs the signal after the addition to the DAC 13 as the PD transmission signal y(t).

The band limitation unit 25 attenuates a component corresponding to the bandwidth of the transmission BB signal x(t) out of the feedback signal z(t) input from the ADC 18 and extracts only the adjacent channel component of the feedback signal z(t).

The ACP calculation unit 26 calculates the ACP of the feedback signal z(t) based on the adjacent channel component of the feedback signal z(t) extracted by the band limitation unit 25.

The control unit 27 controls the amount of phase shift of the variable phase shifter 41 and the gain of the variable gain amplifier 42, which are used for correction of the phase and the amplitude of the PD signal by the PD signal correction unit 22, based on the ACP calculated by the ACP calculation unit 26. Specifically, the control unit 27 includes an amount of phase shift control unit 51 and a gain control unit 52.

The amount of phase shift control unit 51 changes the amount of phase shift of the variable phase shifter 41 in sequence, obtains the ACP corresponding to the amount of phase shift each time the amount of phase shift is changed, and sets the amount of phase shift having the minimum ACP in the variable phase shifter 41 out of a predetermined number of amounts of phase shift. In this regard, the control of the amount of phase shift by the amount of phase shift control unit 51 is performed in a state in which the gain of the variable gain amplifier 42 is fixed.

The gain control unit 52 performs the following processing after the amount of phase shift control unit 51 sets the amount of phase shift in the variable phase shifter 41. That is to say, the gain control unit 52 determines whether or not the ACP is less than or equal to a standard value while repeatedly increasing or decreasing the gain of the variable gain amplifier 42 so that the ACP calculated by the ACP calculation unit 26 this time becomes less than or equal to the value that is calculated the previous time. The gain control unit 52 then sets the gain corresponding to the ACP less than or equal to the standard value in the variable gain amplifier 42. In this manner, the amount of phase shift control unit 51 and the gain control unit 52 sets the amount of phase shift of the variable phase shifter 41 and the gain of the variable gain amplifier 42 respectively so that the PD signal having the phase and the amplitude that are corrected by the PD signal correction unit 22 and nonlinear distortion that occurs in the PA 15 have a reversed phase and an equal amplitude with each other. Thereby, it is possible for the distortion compensation device 12 according to the present embodiment to output the PD transmission signal y(t) that cancels the nonlinear distortion arising in the PA 15.

Figure 5:
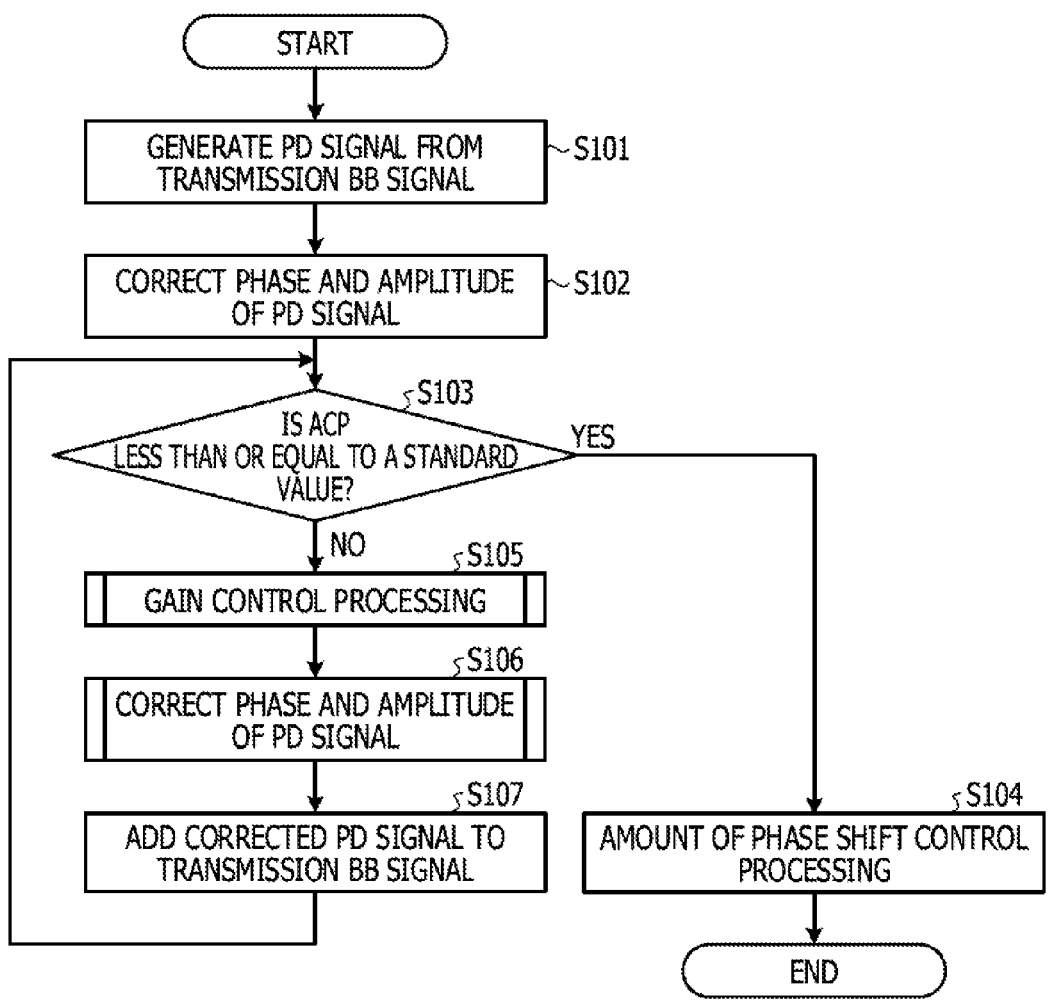
FIG. 5 is a flowchart illustrating an example of a processing operation of the distortion compensation device according to the embodiment.

Next, a description will be given of a specific example of the processing operation of the distortion compensation device 12 according to the present embodiment. FIG. 5 is a flowchart illustrating an example of the processing operation of the distortion compensation device according to the embodiment.

As illustrated in FIG. 5, the PD signal generation unit 21 generates a PD signal from the transmission BB signal input into the distortion compensation device 12 (step S101). That is to say, the OS unit 31 of the PD signal generation unit 21 performs oversampling on the transmission BB signal to generate odd-order harmonic signals of the transmission BB signal in the digital signal band, and the BPF unit 32 extracts the harmonic signals from the transmission BB signal having been subjected to the oversampling. The harmonic signals extracted by the BPF unit 32 are output to the PD signal correction unit 22 as the PD signals.

The PD signal correction unit 22 corrects the phase and the amplitude of the PD signal generated by the corresponding PD signal generation unit 21 (step S102). Specifically, first the control unit 27 sets the initial value of the amount of phase shift and the initial value of the gain in the variable phase shifter 41 and the variable gain amplifier 42 respectively, and after that in the PD signal correction unit 22, the variable phase shifter 41 and the variable gain amplifier 42, whose initial values have been set, correct the phase and the amplitude of the PD signal, respectively. In this regard, the initial value of the amount of phase shift and the initial value of the gain are values predetermined at the time of factory shipment of the distortion compensation device 12, or the like, for example.

The control unit 27 determines whether or not the ACP calculated by the ACP calculation unit 26 is less than or equal to a standard value (step S103). If the ACP is less than or equal to the standard value (step S103 affirmation), the control unit 27 confirms the amount of phase shift set in the variable phase shifter 41 and the gain set in the variable gain amplifier 42. The PD signal correction unit 22 then corrects the phase and the amplitude of the PD signal using the amount of phase shift set in the variable phase shifter 41 and the gain set in the variable gain amplifier 42. The addition unit 24 then adds the PD signal having the phase and the amplitude corrected by the PD signal correction unit 22 to the transmission BB signal (step S104).

On the other hand, if the ACP calculated by the ACP calculation unit 26 is higher than the standard value (step S103 negation), the control unit 27 performs the amount of phase shift control processing and the gain control processing (step S105 and S106). In this regard, the amount of phase shift control processing is processing in which the amount of phase shift control unit 51 of the control unit 27 controls the amount of phase shift of the variable phase shifter 41, and is described later using FIG. 6. Also, the gain control processing is processing in which the gain control unit 52 of the control unit 27 controls the gain of the variable gain amplifier 42, and is described later using FIG. 7.

The PD signal correction unit 22 corrects the phase and the amplitude of the PD signal generated by the corresponding PD signal generation unit 21 (step S107), and the processing returns to step S103. Specifically, first, the control unit 27 sets the amount of phase shift and the gain that are identified in step S105 and S106 in the variable phase shifter 41 and the variable gain amplifier 42, respectively. After that, the PD signal correction unit 22 corrects the phase and the amplitude of the PD signal by the variable phase shifter 41 and the variable gain amplifier 42, whose amount of phase shift and gain were set respectively, and the processing returns to step S103.

Figure 6:
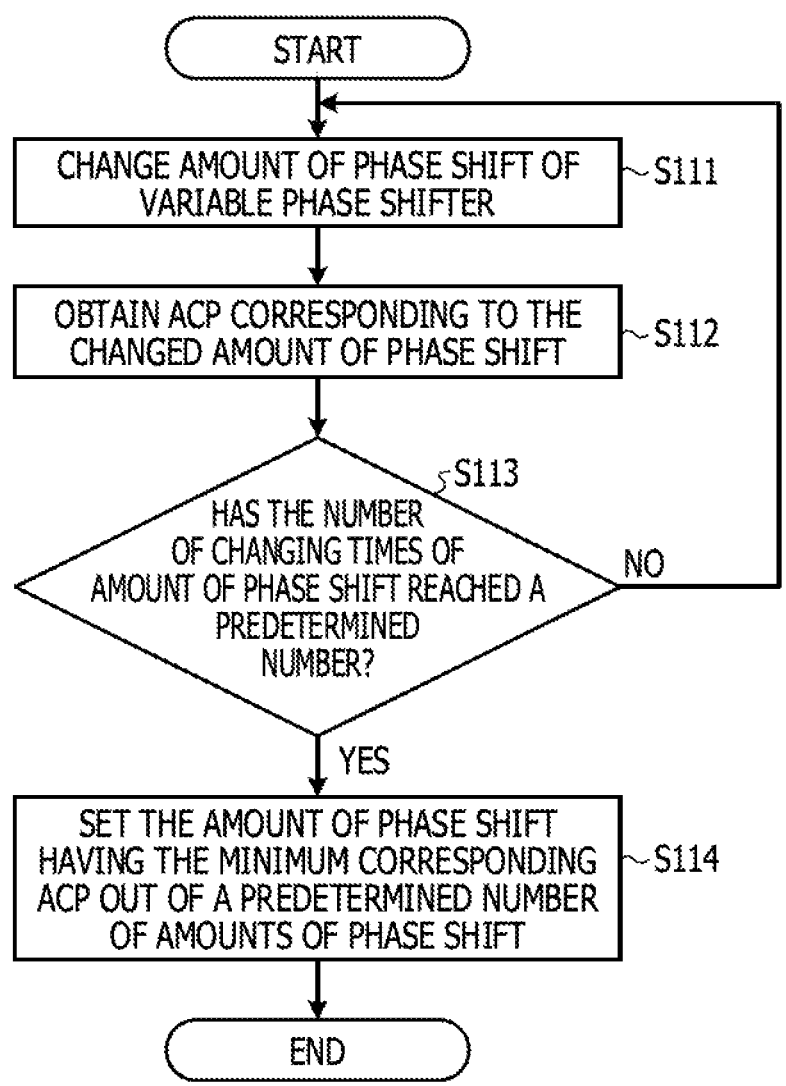
FIG. 6 is a flowchart illustrating an example of amount of phase shift control processing according to the present embodiment.

Next, a description will be given of a specific example of the amount of phase shift control processing illustrated in step S105 in FIG. 5. FIG. 6 is a flowchart illustrating an example of the amount of phase shift control processing according to the present embodiment.

As illustrated in FIG. 6, the amount of phase shift control unit 51 of the control unit 27 changes the amount of phase shift of the variable phase shifter 41 (step S111) and obtains the ACP corresponding to the changed amount of phase shift from the ACP calculation unit 26 (step S112). The ACP value obtained by the amount of phase shift control unit 51 is stored in a buffer for each amount of phase shift.

If the number of changes of the amount of phase shift has not reached the predetermined number (step S113 negation), the processing of the amount of phase shift control unit 51 returns to step S111.

On the other hand, if the number of changes of the amount of phase shift has reached the predetermined number (step S113 affirmation), the amount of phase shift control unit 51 identifies the amount of phase shift having the minimum corresponding ACP out of a predetermined number of amounts of phase shift stored in the buffer and sets the identified amount of phase shift in the variable phase shifter 41 (step S114).

Figure 7:
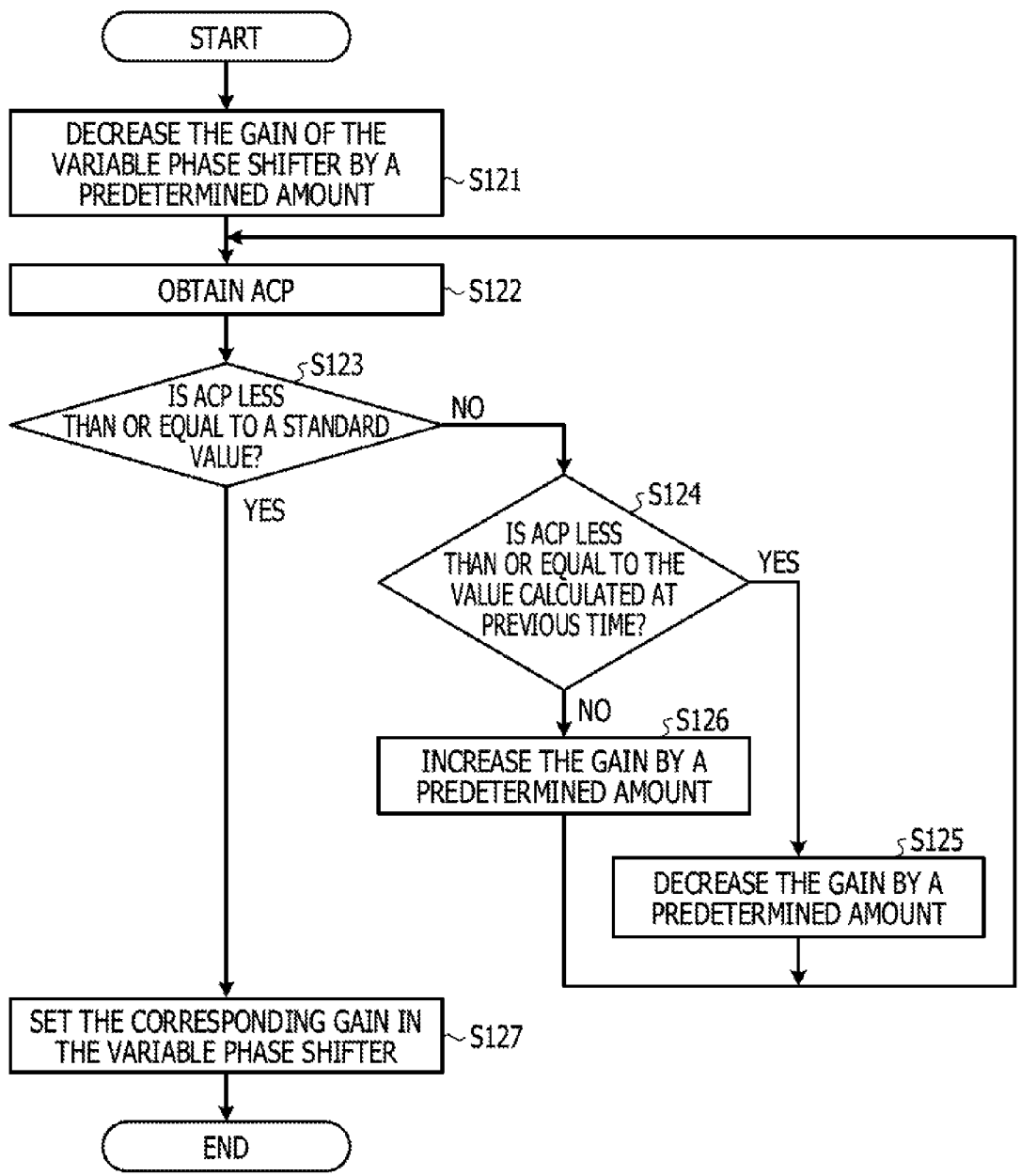
FIG. 7 is a flowchart illustrating an example of gain control processing according to the present embodiment.

Next, a description will be given of a specific example of the gain control processing illustrated in step S106 in FIG. 5. FIG. 7 is a flowchart illustrating an example of the gain control processing according to the present embodiment.

As illustrated in FIG. 7, the gain control unit 52 of the control unit 27 decreases the gain of the variable gain amplifier 42 by a predetermined amount (step S121) and obtains the ACP corresponding to the decreased gain from the ACP calculation unit 26 (step S122).

The gain control unit 52 determines whether or not the ACP is less than or equal to a standard value (step S123), and if the ACP is higher than the standard value (step S123 negation), the gain control unit 52 determines whether or not the ACP has a value less than or equal to the value calculated previous time (step S124). Here, it is assumed that the ACP value obtained by the gain control unit 52 the previous time, that is to say, the ACP value calculated by the ACP calculation unit 26 the previous time is stored in a predetermined buffer.

If the ACP is less than or equal to a value calculated the previous time (step S124 affirmation), the gain control unit 52 decreases the gain of the variable gain amplifier 42 by a predetermined amount (step S125), and the processing returns to step S122. On the other hand, if the ACP is higher than the value calculated the previous time (step S124 negation), the gain control unit 52 increases the gain of the variable gain amplifier 42 by a predetermined amount (step S126), and the processing returns to step S122. In this manner, the gain control unit 52 determines whether or not the ACP is less than or equal to a standard value while repeatedly decreasing the gain of the variable gain amplifier 42 so that the ACP value calculated by the ACP calculation unit 26 this time becomes less than or equal to the ACP value the previous time.

If the ACP is less than or equal to the standard value (step S123 affirmation), the gain control unit 52 identifies a gain corresponding to the ACP that is less than or equal to the standard value and set the identified gain in the variable gain amplifier 42 (step S127).

As described above, in the present embodiment, the distortion compensation device 12 generates a PD signal from the transmission signal before amplification by the PA 15 (that is to say, the transmission BB signal), corrects and the phase and the amplitude of the PD signal using the variable phase shifter and the variable gain amplifier, and adds the corrected PD signal to the transmission BB signal.

With the configuration of the distortion compensation device 12, it is possible to compensate nonlinear distortion that occurs on the signal after the amplification by the PA 15 using the PD signal having the same bandwidth as that of the transmission BB signal. As a result, it is possible to improve the distortion compensation precision regardless of the size of the bandwidth of the transmission BB signal.

Also, in the present embodiment, the transmission BB signal is subjected to oversampling so that odd-order harmonics of the transmission BB signal are generated in the digital signal band, and the harmonics are extracted from the transmission BB signal to be output as a PD signal.

With the configuration of the distortion compensation device 12, it is possible to easily generate a PD signal having the same bandwidth with that of the transmission BB signal, and thus it is possible to improve the distortion compensation precision with a simple configuration.

Also, in the present embodiment, the ACP of the transmission signal after the amplification by the PA 15 (that is to say, the feedback signal) is calculated, and the amount of phase shift of the variable phase shifter and the gain of the variable gain amplifier that are used for correcting the phase and the amplitude of the PD signal are controlled based on the ACP.

With the configuration of the distortion compensation device 12, it is possible to approximate the characteristic of the PD signal to the inverse characteristic of the actual nonlinear distortion of the PA 15, and thus it is possible to suitably improve the distortion compensation precision.

The Other Embodiments

Each component of each unit illustrated in the above-described embodiment does not have to be physically configured as illustrated in the figures. That is to say, a specific mode of distribution and integration of each unit is not limited to the configuration as illustrated in the figures. It is possible to configure all of or a part of the components by functionally or physically distributing the components and integrating the components in any units in accordance with various loads and use states, and the like.

Further, all of or any part of the various processing functions that are carried out by each unit may be performed on a central processing unit (CPU) (or a microcomputer such as a micro processing unit (MPU), a micro controller unit (MCU), or the like). Also, all of or any part of the various processing functions may be performed by a program that is analyzed and executed on a CPU (a microcomputer such as an MPU, an MCU, or the like), or by wired logic hardware.

It is possible to realize the distortion compensation device according to the above-described embodiment by, for example the following hardware configuration.

Figure 8:
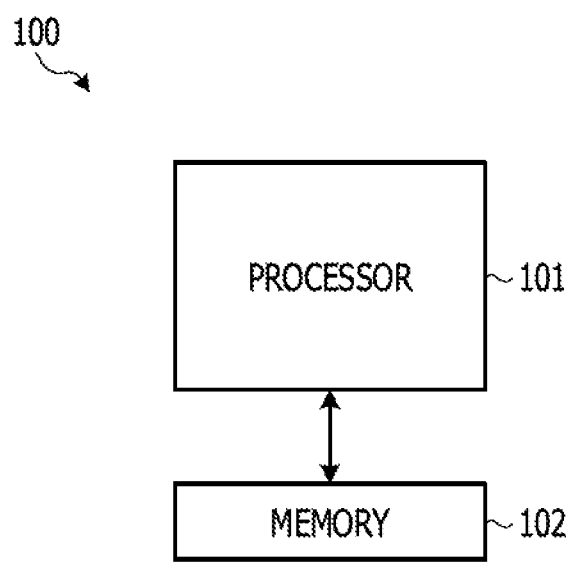
FIG. 8 is a diagram illustrating an example of a hardware configuration of the distortion compensation device.

FIG. 8 is a diagram illustrating an example of a hardware configuration of the distortion compensation device. As illustrated in FIG. 8, a distortion compensation device 100 includes a processor 101 and a memory 102. As an example of the processor 101, a CPU, a digital signal processor (DSP), a field programmable gate array (FPGA), or the like is given. Also, as an example of the memory 102, a random access memory (RAM) such as a synchronous dynamic random access memory (SDRAM), or the like, a read only memory (ROM), a flash memory, or the like is given.

The various processing functions carried out by the distortion compensation device according to the above-described embodiment may be realized by execution of a program stored in various memories, such as a nonvolatile storage medium, or the like by a processor. That is to say, a program corresponding to each processing executed by the PD signal generation unit 21, the PD signal correction unit 22, the delay unit 23, the addition unit 24, the band limitation unit 25, the ACP calculation unit 26, and the control unit 27 may be stored in the memory 102, and each program may be executed by the processor 101.

In this regard, here it is assumed that the various processing functions carried out by the distortion compensation device according to the above-described embodiment are performed by one processor 101. However, the present disclosure is not limited to this, and the various processing functions may be performed by a plurality of processors.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A distortion compensation device coupled to an amplifier configured to amplify power of a transmission signal, the distortion compensation device comprising:
   a memory; and
   a processor coupled to the memory and the processor configured to:
   obtain the transmission signal sampled with a first sampling rate;
   obtain the transmission signal sampled with a second sampling rate, the second sampling rate being higher than the first sampling rate;
   extract an odd-order harmonic from the transmission signal sampled with the second sampling rate;
   correct a phase and an amplitude of the odd-order harmonic;
   add the corrected odd-order harmonic to the transmission signal with the first sampling rate; and
   output, toward the amplifier, the transmission signal to which the corrected odd-order harmonic is added.

2. The distortion compensation device according to claim 1,
   wherein the second sampling rate is a power of the first sampling rate.

3. The distortion compensation device according to claim 1,
   wherein the first processor is configured to:
   calculate an adjacent channel leakage power of the transmission signal after the amplification by the amplifier; and
   control an amount of phase shift of a variable phase shifter to be used for correcting the phase and the amplitude of the odd-order harmonic, and a gain of a variable gain controller based on the adjacent channel leakage power.

4. The distortion compensation device according to claim 3,
   wherein the first processor is configured to:
   change the amount of phase shift in sequence;
   obtain the adjacent channel leakage power corresponding to the amount of phase shift for each change of the amount of phase shift; and
   set the amount of phase shift having the minimum corresponding adjacent channel leakage power in the variable phase shifter out of a predetermined number of the amounts of phase shift.

5. The distortion compensation device according to claim 4,
   wherein the first processor is configured to:
   determine, after the setting the amount of phase shift, whether the adjacent channel leakage power is less than or equal to a standard value while repeatedly increasing or decreasing the gain such that an adjacent channel leakage power becomes less than or equal to a value calculated previous time; and
   set the gain corresponding to the adjacent channel leakage power having less than or equal to the standard value in the variable gain controller.

6. A compensating distortion method executed by a computer, the compensating distortion method comprising:
   obtaining a transmission signal sampled with a first sampling rate;
   obtaining the transmission signal sampled with a second sampling rate, the second sampling rate being higher than the first sampling rate;
   extracting an odd-order harmonic from the transmission signal sampled with the second sampling rate;
   correcting a phase and an amplitude of the odd-order harmonic;
   adding the corrected odd-order harmonic to the transmission signal with the first sampling rate; and outputting, toward an amplifier coupled to the computer, the transmission signal to which the corrected odd-order harmonic is added.

\* \* \* \* \*